United States Patent
Choresh et al.

(10) Patent No.: US 11,593,198 B2
(45) Date of Patent: *Feb. 28, 2023

(54) DATA STORAGE SYSTEM FOR IMPROVING DATA THROUGHPUT AND DECODE CAPABILITIES

(71) Applicant: Western Digital Technologies, Inc., San Jose, CA (US)

(72) Inventors: Shemmer Choresh, Tel Aviv (IL); Tomer Tzvi Eliash, Kfar Saba (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/529,189

(22) Filed: Nov. 17, 2021

(65) Prior Publication Data

US 2022/0075685 A1 Mar. 10, 2022

Related U.S. Application Data

(63) Continuation of application No. 16/905,796, filed on Jun. 18, 2020, now Pat. No. 11,210,164, which is a
(Continued)

(51) Int. Cl.
*G06F 11/10* (2006.01)
*G06F 3/06* (2006.01)
(Continued)

(52) U.S. Cl.
CPC ........ *G06F 11/1048* (2013.01); *G06F 3/0604* (2013.01); *G06F 3/0647* (2013.01);
(Continued)

(58) Field of Classification Search
CPC .............. G06F 11/1048; G06F 3/0647; G06F 13/1668; G06F 3/0604; G06F 13/4068;
(Continued)

(56) References Cited

U.S. PATENT DOCUMENTS 5,867,640 A 2/1999 Aguilar
7,243,185 B2 7/2007 See et al.
(Continued)

FOREIGN PATENT DOCUMENTS

KR 10-2015-0062764 6/2015

OTHER PUBLICATIONS

Gillingham et al., "800 MB/s DDR NAND Flash Memory Multi-Chip Package with Source-Synchronous Interface for Point-to-Point Ring Topology," IEEE Access, Dec. 2013, 6 pages.
(Continued)

*Primary Examiner* — Cynthia Britt
(74) *Attorney, Agent, or Firm* — Morgan, Lewis & Bockius LLP

(57) ABSTRACT

Systems and methods for storing data are described. A system can comprise a controller, one or more physical non-volatile memory devices, a bus comprising a plurality of input/output (I/O) lines. The controller configured to receive data, encode the received data into a codeword, and transfer, in parallel, different portions of the codeword to different physical non-volatile memory devices among the plurality of physical non-volatile memory devices.

20 Claims, 3 Drawing Sheets

Related U.S. Application Data continuation of application No. 15/980,627, filed on May 15, 2018, now Pat. No. 10,725,857.

(60) Provisional application No. 62/636,110, filed on Feb. 27, 2018.

(51) Int. Cl.
  *G06F 11/07* (2006.01)
  *G06F 13/40* (2006.01)
  *G06F 13/16* (2006.01)

(52) U.S. Cl.
  CPC .......... *G06F 3/0679* (2013.01); *G06F 11/076* (2013.01); *G06F 11/0727* (2013.01); *G06F 13/1668* (2013.01); *G06F 13/4068* (2013.01)

(58) Field of Classification Search
  CPC .. G06F 3/0679; G06F 11/076; G06F 11/0727; G06F 3/0659; G06F 3/0688; G06F 3/0613
  See application file for complete search history.

(56) References Cited

U.S. PATENT DOCUMENTS

| | | | |
|---|---|---|---|
| 7,724,163 B2 | 5/2010 | Wong | |
| 8,180,931 B2 | 5/2012 | Le et al. | |
| 8,443,263 B2 | 5/2013 | Sellinger et al. | |
| 9,053,066 B2 | 6/2015 | Ramachandra et al. | |
| 2005/0160329 A1 | 7/2005 | Briggs | |
| 2008/0256352 A1 | 10/2008 | Chow et al. | |
| 2009/0187736 A1 | 7/2009 | Raichelgauz | |
| 2011/0209028 A1 | 8/2011 | Post et al. | |
| 2011/0252289 A1 | 10/2011 | Patapoutian | |
| 2011/0307758 A1 | 12/2011 | Fillingim | |
| 2012/0304039 A1 | 11/2012 | Peterson | |
| 2012/0311406 A1 | 12/2012 | Ratnam et al. | |
| 2014/0122963 A1 | 5/2014 | Motwani et al. | |
| 2014/0122973 A1 | 5/2014 | Motwani et al. | |
| 2014/0325316 A1 | 10/2014 | Ratnam et al. | |
| 2014/0331003 A1 | 11/2014 | Radke | |
| 2014/0344532 A1* | 11/2014 | Lazier | G06F 11/0727 711/154 |
| 2014/0344647 A1 | 11/2014 | Chilappagari et al. | |
| 2016/0110252 A1 | 4/2016 | Hyun | |
| 2016/0291883 A1 | 10/2016 | Manohar et al. | |
| 2017/0160932 A1* | 6/2017 | Thakkar | G06F 11/1068 |
| 2017/0199786 A1 | 7/2017 | Muralimanohar | |
| 2019/0188073 A1 | 6/2019 | Motwani et al. | |
| 2019/0243775 A1 | 8/2019 | Kim | |

OTHER PUBLICATIONS

Silicon Motion Inc., Mobile Storage SM2685 SD Controller, 2011, 1 page.

International Search Report and Written Opinion from PCT/US2019/014584, dated May 8, 2019, 14 pages.

\* cited by examiner

DATA STORAGE SYSTEM FOR IMPROVING DATA THROUGHPUT AND DECODE CAPABILITIES

CROSS-REFERENCE TO RELATED APPLICATIONS

This application is a continuation of application Ser. No. 16/905,796, filed on Jun. 18, 2020, now U.S. Pat. No. 11,210,164, which is a continuation of application Ser. No. 15/980,627, filed on May 15, 2018, now U.S. Pat. No. 10,725,857, which claims the benefit of U.S. Provisional Application No. 62/636,110, filed on Feb. 27, 2018, the entirety of each of which is incorporated herein by reference for all purposes.

BACKGROUND

With the significant growth in the amount of data being stored in data storage systems, the transfer rates of this large amount of data between the data storage systems and the computing systems hosting these data storage systems need to be significantly increased in order to satisfy the performance expectations of the users and/or customers of the data storage system manufacturers.

However, increasing transfer rates of data to and from the data storage systems generates data and signal integrity issues. Additionally, increasing transfer rates and/or number of non-volatile memory interface modules within a data storage system significantly increases design and manufacturing costs of the data storage systems.

SUMMARY

At least one aspect is directed to a data storage system. The data storage system includes a controller, multiple physical non-volatile memory devices, and a bus including multiple input/output (I/O) lines. A first set of input/output (I/O) data lines couples the controller and a first physical non-volatile memory device of the multiple physical non-volatile memory devices. A second set of I/O data lines couples the controller and a second physical non-volatile memory device of the multiple non-volatile memory devices. The controller receives data. The controller encodes the received data into a codeword. The controller transfers, in parallel, a first portion of the codeword to the first physical non-volatile memory device to be stored at the indicated address in the first physical non-volatile memory device and a second portion of the codeword to the second physical non-volatile memory device to be stored at the indicated address in the second physical non-volatile memory device.

At least one aspect is directed to a computer-implemented method. The method includes receiving data. The method includes encoding the received data into a codeword. The method includes transferring a first portion of the codeword to a first physical non-volatile memory device via first set of a multiple input/output (I/O) lines of a bus to be stored at an indicated address in the first physical non-volatile memory device. The method includes transferring a second portion of the codeword, in parallel with the first portion of the codeword to a second physical non-volatile memory device via a second set of the plurality of I/O lines of the bus to be stored at the indicated address in the second physical non-volatile memory device.

At least one aspect is directed to a data storage system. The data storage system includes multiple physical non-volatile memory devices. The data storage system includes a bus including multiple input/output (I/O) lines coupled to a first physical non-volatile memory device of the multiple physical non-volatile memory devices and a second physical non-volatile memory device of the multiple physical non-volatile memory devices. The data storage system includes a means for transferring, in parallel, a first portion of a codeword to the first physical non-volatile memory device via a first set of the I/O lines of the multiple I/O lines to be stored at an indicated address in the first physical non-volatile memory device and a second portion of the codeword to the second physical non-volatile memory device via a second set of the I/O lines of the multiple I/O lines to be stored at the indicated address in the second physical non-volatile memory device.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

Figure 1:
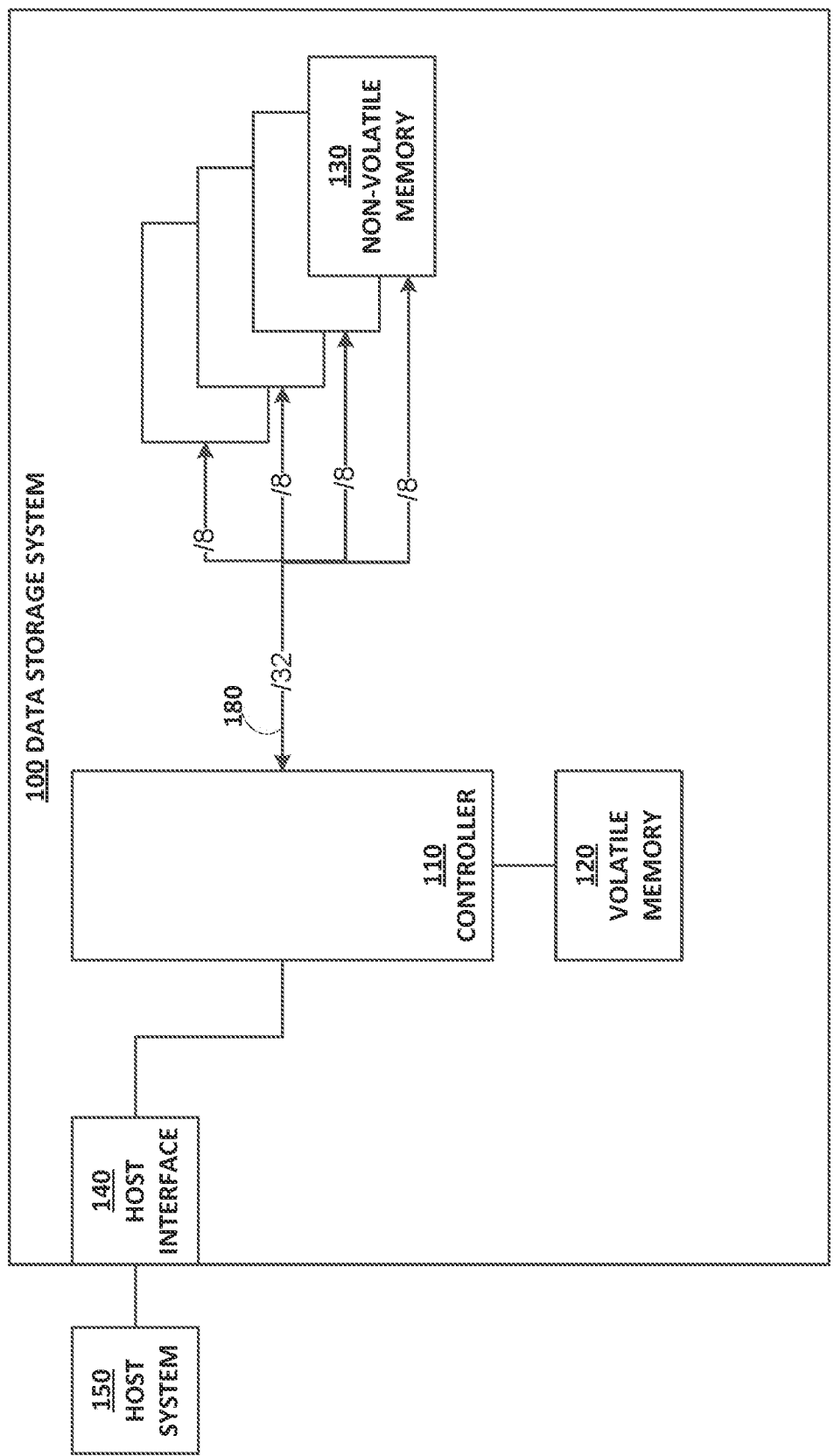
FIG. 1 is a block diagram illustrating components of a data storage system according to an illustrative implementation.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various configurations of the subject disclosure and is not intended to represent the only configurations in which the subject disclosure may be practiced. The appended drawings are incorporated herein and constitute a part of the detailed description. The detailed description includes specific details for the purpose of providing a thorough understanding of the subject disclosure. However, it will be apparent to those skilled in the art that the subject disclosure may be practiced without these specific details. In some instances, structures and components are shown in block diagram form in order to avoid obscuring the concepts of the subject disclosure. Like components are labeled with identical element numbers for ease of understanding.

The subject technology is directed to storing data, in parallel, to a logical non-volatile memory device of a data storage system. As discussed in detail below, the subject technology implements a logical non-volatile memory device that is formed from multiple physical non-volatile memory devices. Each of the non-volatile memory devices is directly connected to a controller of the data storage system via a different set of input/output (I/O) data lines. The controller is configured to transmit a different portion or subset of received data to different physical non-volatile memory devices that form the logical non-volatile memory device, in parallel, using the set of I/O data lines that directly connect a non-volatile memory device to the controller of the data storage system. Therefore, transmission rate of transmitting data between the non-volatile memory devices and the controller, and consequently the data storage system and other components of a host computing device, such as a mobile computing device, or other computing devices communicatively coupled to the host computing device is substantially increased.

The controller can be configured to maintain memory management data of physical non-volatile memory devices, such as block and page management data, and the like, for the logical non-volatile memory device such that amount memory management data of the physical non-volatile memory devices is significantly decreased. Thus, reducing operational and performance costs associated with maintaining and updating memory management data.

In some embodiments, an advantage of such a significant decrease in the amount of memory management data is that a single volatile memory device may store the memory management data needed to successfully perform the various operations of the storage system. Thus, reducing manufacturing costs and design complexity of the data storage systems.

FIG. 1 is a block diagram illustrating components of a data storage system 100 according to aspects of the subject technology. As depicted in FIG. 1, data storage system 100 includes controller 110, volatile memory 120, non-volatile memory 130, and host interface 140. Controller 110 is configured to process requests received from host system 150 via host interface 140 to access data in non-volatile memory 130. The data access requests received from host system 150 may include write requests to store host data in non-volatile memory 130, read requests to retrieve host data stored in non-volatile memory 130, and erase requests to erase host data stored in non-volatile memory 130. Other types of requests, such as status requests or device management requests, may be received from host system 150 and processed by controller 110.

Host interface 140 is configured to couple host system 150 to data storage system 100. Host interface 140 may include electrical and physical connections for operably coupling host system 150 to controller 110. Via the electrical and physical connections, host interface 140 is configured to communicate data, addresses, and control signals between host system 150 and controller 110. Controller 110 is configured to store host data received from host system 150 in non-volatile memory 130 in response to a write request received from host system 150, and to read host data stored in non-volatile memory 130 and to transfer the read host data to host system 150 via host interface 140 in response to a read request received from host system 150.

Host interface 140 may implement standard interfaces including, but not limited to, Serial Advanced Technology Attachment (SATA), Advanced Technology Attachment (ATA), Small Computer System Interface (SCSI), PCI-extended (PCI-X), Fibre Channel, Serial Attached SCSI (SAS), Secure Digital (SD), Embedded Multi-Media Card (EMMC), Universal Flash Storage (UFS) and Peripheral Component Interconnect Express (PCIe). However, the subject technology is not limited to the use of standard interfaces and may utilize custom or proprietary interfaces for communications with host system 150.

Host system 150 represents any device configured to be coupled to and communicate with data storage system 100 via host interface 140 to store and retrieve data in data storage system 100. Host system 150 may be a computing device such as a personal computer, a server, a workstation, a laptop computer, a smart phone, and the like. Alternatively, host system 150 may be an electronic device such as a digital camera, a digital audio player, a digital video recorder, and the like.

Controller 110 is configured to monitor and control the operation of components of data storage system 100 in response to requests received from host system 150 and during execution of internal maintenance operations. Controller 110 may include a multi-core processor, a general-purpose microprocessor, a microcontroller, a digital signal processor (DSP), an application specific integrated circuit (ASIC), a field programmable gate array (FPGA), a programmable logic device (PLD), a state machine, gated logic, discrete hardware components, or a combination of the foregoing. In some aspects, one or more components of controller 110 may be integrated into a single chip or module, or may be implemented in two or more discrete chips or modules.

Volatile memory 120 represents memory used by controller 110 to temporarily store data and information used to manage data storage system 100. For example, controller 110 may use volatile memory 120 as buffers for host data waiting to be written to non-volatile memory 130 or host data read from non-volatile memory 130 waiting to be transferred to host system 150 or written back to non-volatile memory 130. Controller 120 also may use volatile memory 120 as buffers for raw page data and decoded page data for using in the tracking and adjustment of read levels according to the subject technology described herein. Controller 110 also may store various types of system data used in the management of data storage system 100 in volatile memory 120. The system data may include tables mapping logical addresses referenced by host system 150 to physical addresses of non-volatile memory 130, program/erase (P/E) cycle counts, error statistics, valid/invalid data counts, etc. Controller 110 may store some or all of the data and information described above in non-volatile memory 130, or another form of non-volatile memory not shown, so as to preserve the data and information when data storage system 100 is shut down or otherwise loses power. Controller 110 may periodically store copies of the data and information in non-volatile memory 130 or may wait for a shutdown or power-loss event to back up the data and information in non-volatile memory 130.

Volatile memory 120 may be a random-access memory (RAM) such as static RAM (SRAM) or dynamic RAM (DRAM). However, the subject technology is not limited to any particular type of RAM. In addition, volatile memory 120 may be implemented using a single RAM module or multiple RAM modules. While volatile memory 120 is depicted as being distinct from controller 110, portions or all of volatile memory 120 may be incorporated into controller 110.

As depicted in FIG. 1, data storage system 100 includes multiple non-volatile memory devices 130. Each non-volatile memory device 130 can be connected to the controller 110 in parallel via a unique bus arrangement, such as bus 180. For example, FIG. 1 illustrates a single bus 180, which connects four non-volatile memory devices 130 in parallel to the controller 110, includes sufficient number of input/output (I/O) data lines that are each connected to the controller 110 at one end and a non-volatile memory device 130 on the other end, and each of these I/O data lines are connected to the controller 110 and their respective non-volatile memory device 130 in parallel.

Each of the non-volatile memory devices 130 may include a single die or multiple die. Each die may include an array of non-volatile memory cells, such as NAND flash memory cells, where each cell may be used to store one or more bits of data. For example, the flash memory cells can be configured to store one bit of data per cell in a single-level cell (SLC) configuration, three bits of data per cell in a triple-level cell (TLC) configuration, two bits of data per cell in a multi-level cell (MLC) configuration, four bits per cell in a quad-level cell (QLC) configuration, etc. In some implementations, each of the non-volatile memory devices 130 may be implemented in respective chips or packages.

The flash memory cells of a die may be arranged in physical blocks, with each block containing multiple worldlines. Each wordline includes a number of memory cells (e.g., 1 k, 2 k, 4 k, etc.). Depending on the number of bits stored per cell, multiple pages of data may be stored in each wordline. For example, in TLC flash memory three pages of data may be stored in each wordline. The subject technology is not limited to any particular number of wordlines in each physical block. For example, each block may contain 8 wordlines, 16 wordlines, 32 wordlines, etc. Furthermore, the number of physical blocks contained in each flash memory die is not limited to any particular number. In NAND flash memory, the page of a wordline, or the wordline as a whole, represents the smallest unit available for writing data to the flash memory die or reading data from the flash memory die. Physical blocks represent the smallest unit available for erasing data in the flash memory die.

Figure 2:
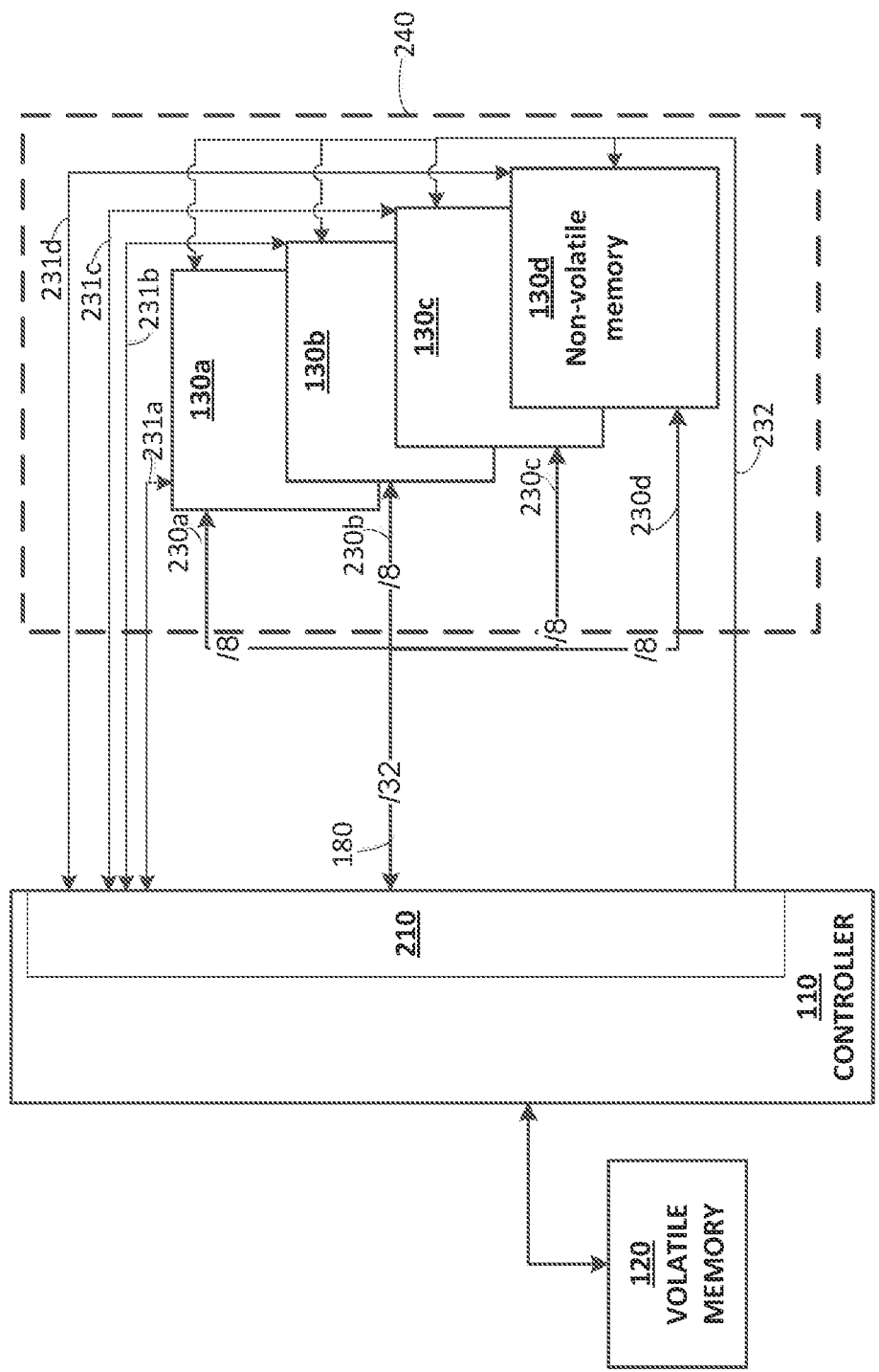
FIG. 2 is a block diagram illustrating components of the a controller and a single logical non-volatile memory device of a data storage system according to an illustrative implementation.

All non-volatile memory devices 130 in the data storage system 100 are logically grouped together to form a single logical non-volatile memory device, such as logical non-volatile memory device 240 (shown in FIG. 2). Other components of the data storage system 100, such as the controller 110, can be configured to communicate with the non-volatile memory devices 130 as the single logical non-volatile memory device 240. Additional details of communicating with the non-volatile memory devices 130 as a single logical non-volatile memory device, such as the single logical non-volatile memory device 240, are described below with reference to FIG. 2 and FIG. 3.

Controller 110 is configured to communicate commands, control information, addresses, data, etc. with the flash memory die via the flash memory channel (not shown separately). The channel may include the bus 180, which connects the controller 110 and each of the non-volatile memory devices 130 in parallel, and configured to communicate electrical signals encoded with commands, control information, addresses, and/or data between controller 110 and the non-volatile memory devices 130. Additional details of the controller 110, the bus 180, and the non-volatile memory devices 130 are described below with respect to FIG. 2.

Turning now to FIG. 2, there is shown a block diagram of a controller of a data storage system. For the purpose of illustrating a clear example, components shown and described with reference to in FIG. 1 will be used to describe the arrangement of components shown in FIG. 2. In addition to the components depicted in FIG. 2, the controller 110 may include other components. For example, the controller 110 may include managers and schedulers for managing read, write, and erase operations within data storage system 100. Similarly, the controller 110 may include an encoder for encoding data, for example, encoding data into a codeword, prior to storage in the logical non-volatile memory device 240, and a decoder for decoding data read from the logical non-volatile memory device 240, for example, decoding the codeword read from the logical non-volatile memory device 240. The encoder and decoder are not limited to any particular error-correcting code (ECC) algorithm. For example, a low-density parity-check code (LDPC) may be used to encode and decode data within data storage system 100. The controller 110 may include multiple instances of encoder and decoders, some of which may be dedicated to soft decoding processes while others to hard decoding processes. Controller 110 also may include an address translation manager to manage the translation of host addresses used by host system 150 to physical addresses of the blocks, wordlines and pages within logical non-volatile memory device 240. Other components may include scramblers, descramblers, maintenance managers (e.g., garbage collection, wear leveling, data relocation, etc.).

As described above, the bus 180 may is configured to include one or more I/O data lines in parallel, such that each data line of the bus 180 connects to the controller 110 at one end and to a non-volatile memory device 130 at the other end of the data link. The bus 180 can be configured and implemented such that a subset of I/O data lines can be connected to a particular non-volatile memory device 130, while another subset of I/O data lines can be connected to a different non-volatile memory device 130. For example, as shown in FIG. 2, I/O data lines 230a, which are a subset of the I/O data lines of the bus 180, are connected to the non-volatile memory device 130a. Similarly I/O data lines, 230b, 230c, 230d, each of which are subsets of the data lines of the bus 180, and are connected to non-volatile memory device 130b, 130c, and 130d, respectively. The I/O data lines of the bus 180 may be generally referred to herein as I/O data lines 230. The number of I/O data lines included in the bus 180 can be selected based on the number of non-volatile memory devices 130 that are included in the data storage system 100 and the number of bits that each of the non-volatile memory device 130 are configured to receive and transfer in parallel. For example, as shown in FIG. 2, four non-volatile memory devices 130 are included in the data storage system 100 and if each of the non-volatile memory devices 130a, 130b, 130c, and 130d can receive and transfer 8 bits of data in parallel, as shown in FIG. 2, then the total number of I/O data lines 230 selected for the bus 180 can be 32 bits, as shown in FIG. 2. The number of data lines of the bus 180 is referred to herein, as the "width" of the bus 180. The width of the bus 180 refers to the total number of bits that the bus 180 is configured to transfer in parallel across the bus 180. In the above example, the width of the bus 180 is 32 bits, as shown in FIG. 2.

As shown in FIG. 2, subsets of the I/O data lines 230, such as I/O data lines 230a, 230b, 230c, 230 may each be branched off from the remaining of the data lines 230 to connect the controller 110 with a respective non-volatile memory device 130. For example, I/O data lines 230a is branched off from the other data lines 230 to connect to the non-volatile memory device 230a. Similarly, I/O data lines 230b is branched off from the other data lines 230 to connect to the non-volatile memory device 130b, and I/O data lines 230c and 230d are branched off from the other data lines 230 to connect to the non-volatile memory devices 130c and 130d, respectively. In some implementations, the non-volatile memory devices 130 are packaged in a flip-chip package. In some implementations, routing design for the data lines 230 to the non-volatile memory devices 130 can be selected based on the packaging of the non-volatile memory devices 130. For example, the non-volatile memory devices 130 can be stacked on top of each other using flip chip interconnection techniques and the routing of the data lines 230 to the non-volatile memory devices 130 can be selected based on such packaging of the non-volatile memory devices 130.

The data storage system 100 described herein is configured to have a I/O data line in a one-to-one configuration between the controller 110 and a non-volatile memory device 130 such that one I/O data line is connected to the controller 110 and only one non-volatile memory device 130 instead of being connected to multiple non-volatile memory devices 130. For example, each of the I/O data lines 230a are in a one-to-one connection with the controller 110 and the non-volatile memory device 130a, each of the I/O data lines 230b are in a one-to-one connection with the controller 110 and the non-volatile memory device 130b, each of the I/O data lines 230c are in a one-to-one connection with the controller 110 and the non-volatile memory device 130c, and each of the I/O data lines 230d are in a one-to-one connection with the controller 110 and the non-volatile memory device 130d, as shown in FIG. 2.

The channel of the data controller 110 includes data lines, each of which are connected to the controller 110 and to a different non-volatile memory device 130, and on which data related to certain command signals, such as read enable (RE) signal, data strobe signal (DQS), and the like, are transmitted. Examples of such data lines include data line 231a connected to the controller 110 and the non-volatile memory device 130a, data line 231b connected to the controller 110 and the non-volatile memory device 130b, data line 231c connected to the controller 110 and the non-volatile memory device 130c, data line 231d connected to the controller 110 and the non-volatile memory device 130d. The channel of the data controller 110 includes a data line that is connected to the controller 110 and to each of the non-volatile memory devices 130 in the data storage system 100, such as data line 232, on which data related to certain command signals that are generally considered as slow signals by those that are skilled in the art, such as address latch enable (ALE), command latch enable (CLE), write enable (WE), chip enable (CEn), and the like, are transmitted. Since the non-volatile memory devices 130 are grouped together to form a single logical non-volatile memory device, using a single data line that connects the controller to all the non-volatile memory devices 130 for transmission of slow signals reduces the manufacturing costs and design complexity of the data storage system 100 without impacting the speed of transmission of other types of data that have high transmission speed thresholds.

As described above, in grouping all non-volatile memory devices 130 in the data storage system 100 to form a single logical non-volatile memory device, such as logical non-volatile memory device 240, the other components of the data storage system 100, such as the controller 110, can be configured to communicate with the non-volatile memory devices 130 as the single logical non-volatile memory device 240. Details of communicating with the non-volatile memory devices 130 as the single logical non-volatile memory device 240, are described below and with reference to FIG. 3.

As depicted in FIG. 2, the controller 110 includes a non-volatile memory interface module 210. The non-volatile memory interface module 210 is configured to transmit and receive electrical signals between the controller 110 and one or more of the non-volatile memory devices 130 via the bus 230. As described above, the controller 110 is configured to communicate with the non-volatile memory devices 130 as a single logical non-volatile memory device, accordingly the non-volatile memory interface module 210 of the controller 110 can be configured to communicate with the non-volatile memory devices 130 as a single logical non-volatile memory device, such as the single logical non-volatile memory device 240, by transmitting data to and retrieving data from the non-volatile memory devices 130 in parallel via the bus 230.

For example, while storing data in the non-volatile memory devices 130, the non-volatile memory interface module 210 is configured to transmit data to the single logical non-volatile memory device 240, by transferring the maximum amount of data that the bus 180 can transfer in parallel at the same time. Due to the unique arrangement of the I/O data lines 230 of the bus 180, described above, the data transferred to the bus 180 is automatically transferred, in parallel, to the different non-volatile memory devices 130 connected to the data lines 230, rather than serially to one non-volatile memory device 130. For example, if 4 bytes of data is to be written, then the non-volatile memory interface module 210 can be configured to write the 4 bytes of data to the logical non-volatile memory device 240 by transferring the maximum amount of the 4 bytes of data that the bus 180 can transfer in parallel. In other words, the non-volatile memory interface module 210 can be configured to determine the maximum amount of the 4 bytes of data to transfer to the bus 180 based on the width of the bus 180. If, for example, the width of the bus 180 is 32 bits, then the non-volatile memory interface module 210 can determine that the maximum amount of data to transfer to the bus is the 32 bits (i.e. 4 bytes) of the 4 bytes of data. The entire 4 bytes of data that is transferred to the bus 180 is written to the non-volatile memory devices 130 in parallel, with each of the non-volatile memory devices 130 receiving a portion of the 4 bytes of data, in parallel.

The portion of the 4 bytes of data that a non-volatile memory device 130 receives is based on the data lines 230 that connect that particular non-volatile memory device 130 to the controller 110 and the bits being transferred on those data lines 230. For example, if there are 32 I/O data lines in the bus 180 and eight of the 32 I/O data lines 230 connect to the non-volatile memory device 130a (e.g., I/O data lines 230a), the next eight of the 32 I/O data lines 230 connect to the non-volatile memory device 130b (e.g., I/O data lines 230b), the next eight of the 32 I/O data lines 230 connect to the non-volatile memory device 130c (e.g., I/O data lines 230c), and the last eight of the 32 I/O data lines 230 connect to the non-volatile memory device 130d (e.g., I/O data line 230d), and if the data is transferred to the bus 180 such that the first 8 bits of the data is transferred across the I/O data lines 230a and the next 8 bits transferred across I/O data lines 230b, the next 8 bits across I/O data lines 230c, and the final 8 bits across I/O data lines 230d, then, in parallel, the first 8 bits of the 4 bytes of data will be stored in non-volatile memory device 130a, the next 8 bits of the 4 bytes will be stored in non-volatile memory device 130b, the next 8 bits will be stored in the non-volatile memory device 130c, and the final 8 bits will be stored in the non-volatile memory device 130d.

The non-volatile memory interface module 210 is configured to transmit and receive data related to certain command signals, such as read enable (RE) signal, data strobe signal (DQS), via data line 231a to non-volatile memory device 130a, via data line 231b to non-volatile memory device 130b, via data line 231c to non-volatile memory device 130c, via data line 231d to non-volatile memory device 231d. The non-volatile memory interface module 210 is configured to transmit and receive data related to certain command signals that are considered to be slow signals by those that are skilled in the art, such as address latch enable (ALE), command latch enable (CLE), write enable (WE), chip enable (CEn), and the like, via data line 232. As depicted in FIG. 2, and as described above, the data line 232 is connected to the controller 110 and to each of the non-volatile memory device 130 that is included in the single logical non-volatile memory device 240.

In transmitting data to the non-volatile memory devices 130 as single logical non-volatile memory device 240, the non-volatile memory interface module 210 is configured to identify a physical non-volatile memory device address and transmit the data via the bus 180, in parallel, to different non-volatile memory devices 130 at the same identified physical non-volatile memory device address. As described above, due to the unique arrangement of the bus 180, different portions of the data or codeword are transferred, in parallel, to different non-volatile memory devices 130. For example, if the non-volatile memory interface module 210 identifies the physical address 0x01 as an available address to store data, then non-volatile memory interface module 210 is configured to transmit a first byte of the 4 bytes of data to the non-volatile memory device 130a at physical address 0x01 of the non-volatile memory device 130a via I/O data lines 230a, a second byte of the 4 bytes of data to the non-volatile memory device 130b at the physical address 0x01 of the non-volatile memory device 130b via I/O data lines 230b, a third byte of the 4 bytes of data to the non-volatile memory device 130c at physical address 0x01 of the non-volatile memory device 130c via I/O data lines 230c, and a fourth byte of the 4 bytes of data to the non-volatile memory device 130d at physical address 0x01 of the non-volatile memory device 130d via I/O data lines 230d. Similarly, different portions of codeword are transmitted, in parallel, to different non-volatile memory devices 130.

By storing different portions of data or codeword across different non-volatile memory devices 130, the data storage system 100 described herein reduces the probability of data or codeword being affected by a defect in a non-volatile memory device 130, such as a defect in a page of the non-volatile memory device. Thus, reducing the bit error rate (BER) of the data or codeword when the data is read or retrieved from the non-volatile memory devices 130. For example, if 4 bytes of data or codeword is stored in the single logical non-volatile memory device 240 with a first 8 bits of the 4 bytes of data or codeword being stored in the non-volatile memory device 130a, a second 8 bits in the non-volatile memory device 130b, a third 8 bits in the non-volatile memory device 130c, and last 8 bits stored in the non-volatile memory device 130d, then a defect in the page of non-volatile memory device 130a only affects the first 8 bits of data stored in the non-volatile memory device 130a, but not the remaining 24 bits of data stored in the non-volatile memory devices 130b, 130c, and 130d, such that the bit error rate of the first 8 bits of data may be higher than the remaining 24 bits of data. Similarly, in some implementations, different portions of the codeword for the 4 bytes of data may be stored in a corresponding non-volatile memory device 130. For example, a portion of the codeword for the 4 bytes of data corresponding to the first eight bits of the 4 bytes of data may be stored in the non-volatile memory device 130a, a portion of the codeword corresponding to the second eight bits of the 4 bytes of data may be stored in the non-volatile memory device 130b, a portion of the codeword corresponding to the third eight bits of the 4 bytes of data may be stored in the non-volatile memory device 130c, a portion of the codeword corresponding to the last eight bits of the 4 bytes of data may be stored in the non-volatile memory device 130d. Therefore, by storing different portions of data and/or codeword across multiple non-volatile memory devices 130 of a single logical non-volatile memory device, the bit error rate of total data or the codeword of the total data is less than the bit error rate of data or the entire codeword stored in a single non-volatile memory device 130. Thus, by storing different portions of the codeword at different non-volatile memory devices 130, sensitivity of a decoder of the controller 110 to a defect in any one of the non-volatile memory devices 130 is reduced. The reduction in bit error rate also significantly improves decoding of the data affected by the defect in the non-volatile memory device 130.

As described above, a BER of a codeword or data may be based on a defect of a non-volatile memory device in which the codeword is stored. Due to the variance in defects of a non-volatile memory devices within a data storage system, such as the non-volatile memory devices 130 within the data storage system 100, a BER of one non-volatile memory device 130 among the non-volatile memory devices 130 within the data storage system 100 may be different than a BER of another non-volatile memory device 130 among the non-volatile memory devices 130 within the data storage system 100. For example, a non-volatile memory device 130 with one or more defects may have a higher BER than a non-volatile memory device 130 with no defects. BER of the portions of data and/or codeword stored in one or more non-volatile memory devices 130 with a BER lower than one or more other non-volatile memory devices 130 is lower than BER for the portions of the data and/or codeword stored in the one or more other non-volatile memory devices 130 with the relatively higher BER. Thereby, with the storing of the different portions of the data and/or codeword in different non-volatile memory devices 130, the one or more non-volatile memory devices 130 with a BER lower than the one or more other non-volatile memory devices 130 compensate for the relatively higher BER of the one or more other non-volatile memory devices 130 in allowing the data storage system 100 to satisfy a threshold BER for the data and/or codeword stored in the data storage system 100.

With the storing of portions of the data and/or codeword in different non-volatile memory devices 130, and one or more non-volatile memory devices 130 with a relatively lower BER compensating for the one or more non-volatile memory devices 130 with a relatively higher BER, a threshold BER for the data storage system and/or non-volatile memory devices 130 may be relaxed such that more non-volatile memory devices satisfy the relaxed BER threshold, thereby increasing production yield of non-volatile memory devices, such as the non-volatile memory devices 130, during manufacturing of the non-volatile memory devices 130 and/or the data storage system 100.

Since all the non-volatile memory devices 130 are logically grouped together to form the single logical non-volatile memory device 240, a single set of block and page management data, associated with the logical non-volatile memory device 240 is used rather than block and page management data for each of the individual non-volatile memory devices 130. Thus, reducing overhead costs involved in maintaining block and page management data. For example, typically block and page management data of each non-volatile memory device are stored in separate data structures associated with the non-volatile memory devices and at least copies of these data and are stored and maintained in volatile memory units, such as the volatile memory device 120, operably coupled to a controller of the data storage system, such as the controller 110. Separately storing and maintaining such block and page management data for each non-volatile memory device results in a large amount of such data, which requires multiple volatile memory units to store and maintain such a large amount of data. The multiple volatile memory units increase the manufacturing costs of the data storage system and increases overhead costs associated with maintaining the large amount of block and page management data.

However, as described above, with a single set of block and page management data, associated with the with the logical non-volatile memory device 240 and not directly with each of the non-volatile memory devices 130, the block and page management data necessary to communicate with the non-volatile memory devices 130 can be stored in fewer and smaller data structures, for example, in single table, thus requiring significantly less memory to efficiently perform the operations of a data storage system 100. Thus, the data storage system 100 described herein and the above described methods and techniques of data communication between the controller 110 and non-volatile memory devices 130 and the grouping of non-volatile memory devices 130 to form the single logical non-volatile memory device 240 significantly reduces the manufacturing costs and operational overhead costs of the data storage system 100, while improving operational efficiency of the data storage system 100.

Figure 3:
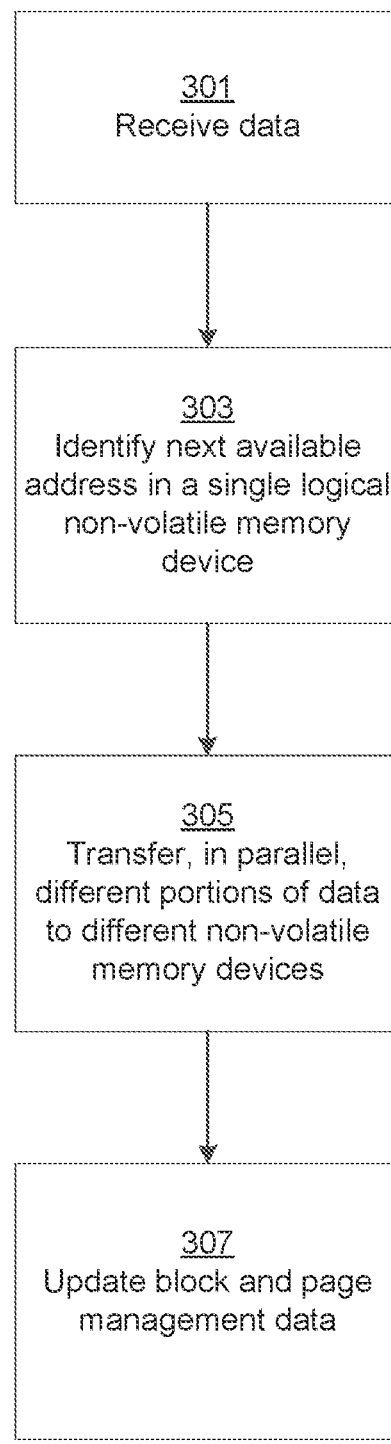
FIG. 3 is a flow chart of an example method of transmitting data to a single logical non-volatile memory device of a data storage system according to an illustrative implementation.

Turning now to FIG. 3, there is shown a flowchart illustrating a process of transmitting data to a single logical non-volatile memory device that includes multiple physical non-volatile memory devices. For the purpose of illustrating a clear example, components of the data storage system 100 shown and described with reference to FIGS. 1 and 2 will be used to describe the process of transmitting data to a single logical non-volatile memory device. The method 300 includes receiving data at a controller of a data storage system, such as the controller 110 of the data storage system 100 (block 301). The controller 110 may receive the data from a host device that is hosting the data storage system 100. In some implementations, the controller 110 may receive a signal or an instruction indicating that the received data is to be stored in a non-volatile memory device 130. As described above, the non-volatile memory devices 130 of the data storage system 100 are grouped into a single logical non-volatile memory device, such as the single logical non-volatile memory device 240. The controller 110 may encode the data into a codeword.

Accordingly, the controller 110 is configured to identify a next available address of the single logical non-volatile memory device 240 (block 303). As described above, a single set of block and page management data is stored for the single logical non-volatile memory device 240, and the controller 110 can be configured to identify the next available address of the single logical non-volatile memory device based on the block and page management data. The next available address identified by the controller 110 is a physical address that is available at each of the non-volatile memory devices 130 that form the single logical non-volatile memory device 240. For example, if the controller 110 identifies address 0xF0 as the next available address in the single logical non-volatile memory device 240 to store data, then the address 0xF0 is a physical address 0xF0 that is available at the physical non-volatile memory devices 130*a*, 130*b*, 130*c*, 130*d*, which form the single logical non-volatile memory device 240. In some implementations, the identified next available address may be transferred to the controller 110.

The controller 110 is configured to transfer the identified address to each of the non-volatile memory devices 130 and may transmit a control signal, such as an address latch enable signal, via data line 232, to each of the non-volatile memory devices 130, such that the next data received by the non-volatile memory devices 130 are stored at the transferred identified address in the non-volatile memory devices 130. In some implementations the controller 110 may transmit the identified address to the non-volatile memory devices 130 via the I/O data lines of the bus 180. In some implementations, the identified address may be transferred to the non-volatile memory device 130 via a different set of data lines (not shown) that connect the non-volatile memory devices and the controller 110.

The controller 110 is configured to transfer, in parallel, different portions of the received data into different non-volatile memory devices 130 (block 305). The controller 110 transfers data to the non-volatile memory devices 130 at the identified available address. The controller 110 may transfer different portions of the codeword of the received data into the non-volatile memory devices 130 at the identified available address. The controller 110 is configured to transfer the portions of data or codeword via the bus 180. The data or codeword placed on the bus 180 is transferred, in parallel, to the non-volatile memory devices 130 via the I/O data lines coupled to the non-volatile memory devices 130 and the controller 110, such as data lines 230*a*, 230*b*, 230*c*, 230*d*. As described above, the unique arrangement of the bus 180, including the I/O data lines 230, is configured for the transfer of different portions of the data or the codeword to different non-volatile memory devices 130 in parallel, thereby transferring data to the single logical non-volatile memory device 240. As described above, an example of the data or codeword transmitted to the single logical non-volatile memory device 240, in parallel, can be such that a first portion of the data or codeword, such as the first byte of data, to non-volatile memory device 130*a*, a second portion of the data or codeword, such as the second byte of data, to non-volatile memory device 130*b*, a third portion of the data or codeword, such as the third byte of data to non-volatile memory device 130*c*, a fourth portion of the data or codeword, such as the fourth byte of data, to non-volatile memory device 130*d*. In some implementations, data can be transferred to a different non-volatile memory device 130 in parallel at a control clock signal of the data storage system 100, such as a rising or a falling edge of the control clock signal of the data storage system 100.

In some implementations, if the size of a set of data or codeword being transferred to the non-volatile memory devices is less than the width of the bus 180, then the controller 110 is configured to append a default bit value, such as a "1" or a "0" to a set of data when transferring to the non-volatile memory devices. In some implementations, the controller 110 is configured to append one or more bytes of zero values to the data, based on the size of the data and the width of the bus 180, and the one or more bytes of zero values are transferred, in parallel, along with the data, to different non-volatile memory devices, based on the number of bits the non-volatile memory devices can receive, of the logical non-volatile memory device. The controller 110 is configured to read, in parallel, the different portions of the data or different portions of the codeword from the non-volatile memory devices 130. The controller 110 is configured to decode the codeword that includes the different portions of the codeword read, in parallel, from the non-volatile memory devices 130. As described above, the controller 110 is configured to decode the codeword using an error-correcting code algorithm. The controller 110 is not limited to any particular error-correcting code (ECC) algorithm in decoding a codeword. For example, a low-density parity-check code (LDPC) may be used to decode data within data storage system 100.

The controller 110 updates the block and page management data for the single logical non-volatile memory device 240 (block 307). In some implementations, the controller 110 is configured to update the block and page management data by indicating the physical addresses in the non-volatile memory devices that are not free or available to receive new data.

The blocks of the flowchart illustrated in FIG. 3 have been described as occurring sequentially. The subject technology is not limited to the described sequential performance of the illustrated process. One or more of the blocks may be performed in parallel with other blocks in the illustrated process. Other variations in the illustrated process are within the scope of the subject technology.

Many of the above-described features of example process and related features and applications, may be implemented as software or firmware processes that are specified as a set of instructions recorded on a processor-readable storage medium (also referred to as computer-readable medium). When these instructions are executed by one or more processing unit(s) (e.g., one or more processors, cores of processors, or other processing units), the processing unit(s) are caused to perform the actions indicated in the instructions. Examples of processor-readable media include, but are not limited to, volatile memory 120, non-volatile memory 130, as well as other forms of media such as magnetic media, optical media, and electronic media. The processor-readable media does not include carrier waves and electronic signals communicated wirelessly or over wired connections.

The term "software" is meant to include, where appropriate, firmware residing in memory or applications stored in memory, which may be read into a working memory for processing by a processor. Also, in some implementations, multiple software aspects of the subject disclosure may be implemented as sub-parts of a larger program while remaining distinct software aspects of the subject disclosure. In some implementations, multiple software aspects may also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code).

It is understood that illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject disclosure.

It is understood that the specific order or hierarchy of steps in the processes disclosed is presented as an illustration of some exemplary approaches. Based upon design preferences and/or other considerations, it is understood that the specific order or hierarchy of steps in the processes may be rearranged. For example, in some implementations some of the steps may be performed simultaneously. Thus the accompanying method claims present elements of the various steps in a sample order, and are not meant to be limited to the specific order or hierarchy presented.

The previous description is provided to enable any person skilled in the art to practice the various aspects described herein. The previous description provides various examples of the subject disclosure, and the subject disclosure is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

The phrases "in communication with" and "coupled" mean in direct communication with or in indirect communication with via one or more components named or unnamed herein (e.g., a memory card reader)

A phrase such as an "aspect" does not imply that such aspect is essential to the subject disclosure or that such aspect applies to all configurations of the subject disclosure. A disclosure relating to an aspect may apply to all configurations, or one or more configurations. An aspect may provide one or more examples. A phrase such as an aspect may refer to one or more aspects and vice versa. A phrase such as an "implementation" does not imply that such implementation is essential to the subject disclosure or that such implementation applies to all configurations of the subject disclosure. A disclosure relating to an implementation may apply to all aspects, or one or more aspects. An implementation may provide one or more examples. A phrase such as an "implementation" may refer to one or more implementations and vice versa. A phrase such as a "configuration" does not imply that such configuration is essential to the subject disclosure or that such configuration applies to all configurations of the subject disclosure. A disclosure relating to a configuration may apply to all configurations, or one or more configurations. A configuration may provide one or more examples. A phrase such as a "configuration" may refer to one or more configurations and vice versa.

The word "exemplary" is used to mean "serving as an example or illustration." Any aspect or design described herein as "exemplary" is not necessarily to be construed as preferred or advantageous over other aspects or designs.

What is claimed is:

1. A data storage system, comprising:
one or more controllers; and
multiple physical memories,
wherein the multiple physical memories are configured to be grouped into a logical memory,
wherein the one or more controllers are configured to cause:
determining one address of the logical memory for storing data, wherein the one address corresponds to a physical address available at each of the multiple physical memories, and wherein the data comprises multiple portions; and
storing each of the multiple portions at the corresponding physical address of a corresponding memory of the multiple physical memories.

2. The data storage system of claim 1, wherein the physical addresses of the multiple physical memories are same.

3. The data storage system of claim 1, wherein the one or more controllers are configured to cause: transferring in parallel the multiple portions of the data to the corresponding physical addresses of the multiple physical memories.

4. The data storage system of claim 1, wherein:
the multiple portions of the data are different portions of the data; and
the multiple physical memories are different physical memory devices.

5. The data storage system of claim 1, comprising:
a bus located between the one or more controllers and the multiple physical memories,
wherein the one or more controllers are configured to cause:
appending one or more bits or bytes to the data based on a size of the data and a width of the bus; and
transferring, in parallel, the data and the one or more bits or bytes to different memories of the multiple physical memories based on a number of bits or bytes receivable by the different memories.

6. The data storage system of claim 1, wherein the one or more controllers are configured to cause: encoding the data into a codeword having the multiple portions prior to the storing.

7. The data storage system of claim 1, wherein the one or more controllers are configured to cause:
reading, in parallel, different portions of the data from different physical memories among the multiple physical memories; and
decoding the data comprising the different portions of the data.

8. The data storage system of claim 1, wherein a bit error rate of at least a memory of the multiple physical memories is higher than a bit error rate of other memories of the multiple physical memories, and wherein the data storage system is configured to cause spreading the data over the multiple physical memories to reduce a sensitivity of a decoder to a physical defect in one of the multiple physical memories.

9. The data storage system of claim 8, wherein the other memories of the multiple physical memories are configured to cause compensating for the higher bit error rate of the at least a memory of the multiple physical memories.

10. The data storage system of claim 1, wherein the one or more controllers are configured to cause:
transferring the determined address to each of the multiple physical memories via a first line; and
transferring the multiple portions of the data to the multiple physical memories via data lines that are different from the first line.

11. A method for a data storage system, wherein the data storage system comprises multiple physical memories configured to be grouped into a logical memory, wherein the method comprises:
determining one address of the logical memory for storing data, wherein the one address corresponds to a physical address available at each of the multiple physical memories, and wherein the data comprises multiple portions; and
storing each of the multiple portions at the corresponding physical address of a corresponding memory of the multiple physical memories.

12. The method of claim 11, wherein the physical addresses of the multiple physical memories are same.

13. The method of claim 11, comprising: transferring in parallel the multiple portions of the data to the corresponding physical addresses of the multiple physical memories.

14. The method of claim 11, wherein:
the multiple portions of the data are different portions of the data; and
the multiple physical memories are different physical memory devices.

15. The method of claim 11,
wherein the data storage system comprises:
one or more controllers; and
a bus located between the one or more controllers and the multiple physical memories, and wherein the method comprises:
appending one or more bits or bytes to the data based on a size of the data and a width of the bus; and
transferring, in parallel, the data and the one or more bits or bytes to different memories of the multiple physical memories based on a number of bits or bytes receivable by the different memories.

16. The method of claim 11, comprising: encoding the data into a codeword having the multiple portions prior to the storing.

17. The method of claim 11, wherein a bit error rate of at least a memory of the multiple physical memories is higher than a bit error rate of other memories of the multiple physical memories, and wherein the data storage system is configured to cause spreading the data over the multiple physical memories to reduce a sensitivity of a decoder to a physical defect in one of the multiple physical memories.

18. The method of claim 11, comprising:
- transferring the determined address to each of the multiple physical memories via a first line; and
- transferring the multiple portions of the data to the multiple physical memories via data lines that are different from the first line.

19. An apparatus, comprising:
- multiple physical memories;
- means for grouping the multiple physical memories into a logical memory;
- means for determining one address of the logical memory for storing data, wherein the one address corresponds to a physical address available at each of the multiple physical memories, and wherein the data comprises multiple portions; and
- means for storing each of the multiple portions at the corresponding physical address of a corresponding memory of the multiple physical memories.

20. The apparatus of claim 19, wherein the physical addresses of the multiple physical memories are same.

\* \* \* \* \*